United States Patent Office 2,934,581
Patented Apr. 26, 1960

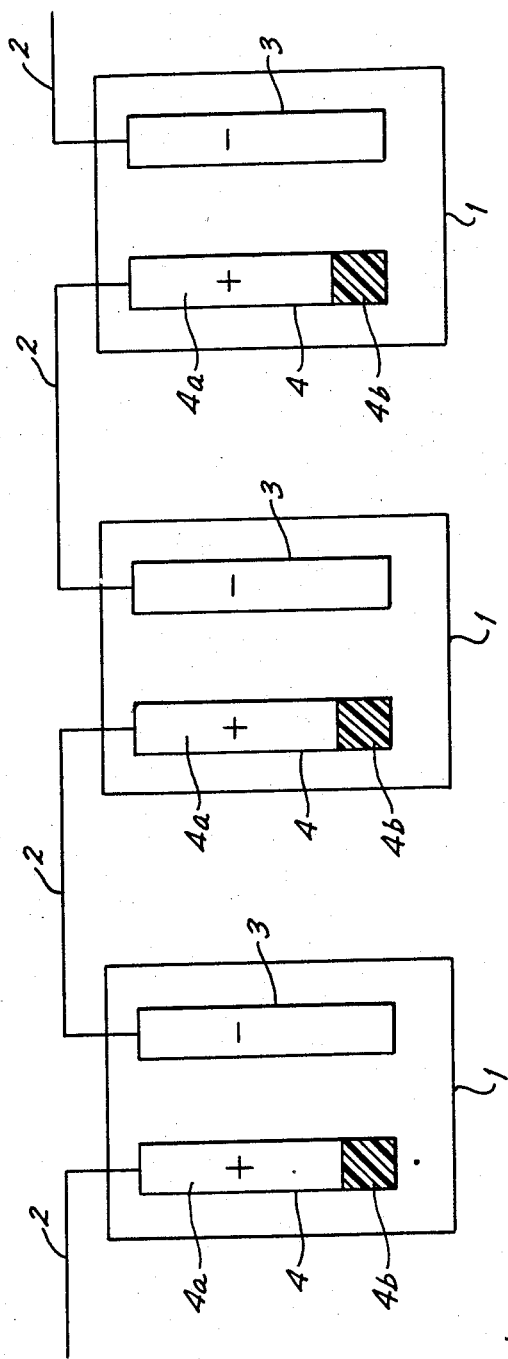

2,934,581
ELECTRODES FOR ALKALINE ACCUMULATORS

Adolf Dassler, Hagen, Westphalia, Germany, assignor to Accumulatoren-Fabrik Aktiengesellschaft, Hagen, Westphalia, Germany, a joint-stock company under German law Application November 28, 1952, Serial No. 323,143

Claims priority, application Germany December 1, 1951

3 Claims. (Cl. 136—9)

This invention relates to alkaline accumulators and more especially to their positive and negative electrodes.

It has for one of its objects to so improve the composition of materials incorporated in these electrodes as to avoid certain developments of gases hitherto occurring in these electrodes under certain conditions.

As is well known to those skilled in the art, the individual cells of an alkaline storage battery, after having been in use for some time, sometimes lose their initial uniform capacity, although, when being produced, they were made from identical quantities of active material of uniform quality. Although being treated equally and under equal electric conditions, the individual cells, connected in series, of such a battery in the course of time are subject to differently rapid wear, and when the battery is discharged, the terminal voltage of some cells or elements will drop prematurely, while the other cells still have a sufficient terminal voltage so as to enable the further collection of current from the battery. This difference in the capacity of the individual cells, particularly when not carefully attended, may be so considerable that some cells, after exhaustive discharge of the storage battery, may reverse their polarity. If the discharge of current still takes place beyond this reversal, there will occur at the electrodes of these cells, soon after their terminal voltage has dropped below zero point and has reversed its polarity, a development, corresponding to the discharge current, of hydrogen gas or oxygen gas or both gases together, according to whether the positive or the negative or both electrodes together reverse their polarity.

Such a development of gases, if it is hydrogen, leading to the formation of oxyhydrogen gas, creates the danger of an explosion of the accumulator boxes namely, the accumulator cells. If the cells are closed hermetically i.e. sealed, they may be expanded and burst by the gases. The same danger exists in batteries which are provided with gas-absorbing electrodes.

See for instance German Patent No. 602,702, since these electrodes are merely able to absorb the same quantities of gases developed subsequently to the charging, and would also fail if they reversed their polarity.

I have now found that it is possible to so construct the electrodes of alkaline accumulators, as schematically shown in the accompanying drawing as to render them safe against any development of gases occurring when they are discharged also beyond the reversal of polarity.

As shown in this drawing, an embodiment of an alkaline-type accumulator battery according to my invention comprises a plurality of sealed individual accumulator cells 1 connected, as indicated by the reference numerals 2, in series; each of these cells includes a negative electrode 3 and a positive electrode 4.

I have found that, as far as the positive electrodes 4 are concerned, any development of hydrogen gas directly after the reversal can be prevented from occurring by filling these electrodes 4 in addition to the usual regular active mass 4a consisting of nickelic hydroxide and conductive material such as graphite or nickel flakes, with an oxide or hydroxide which is cathodically reducible during discharge only after the electrode potential has sunk to or below the potential of the hydrogen electrode in the electrolyte surrounding the electrodes, for instance cadmium oxide, cadmium hydroxide or ferric hydroxide, i.e. with a material such as hitherto served in an alkaline accumulator mainly in the negative electrode and which is reduceable at a potential below the separation potential of hydrogen.

In such a case the cadmium oxide or the like antipolar mass 4b present in a positive electrode 4 acts, in a certain way, like an acceptor for hydrogen, being reduced, in the case of a pole reversal of the cell 1, at a considerably lower potential than would be required for the development of hydrogen at the electrode 4. Only after the cadmium oxide or like anti-polar mass 4b present has been reduced to metal, the electrode 4, with the current discharge continuing, can develop hydrogen.

If, in addition to this, the counter-electrode, i.e. the negative electrode 3 of the cell 1, is made sufficiently large and efficient as shown in the drawing, by incorporating in it the necessary excess of negative mass, so that the capacity of the regular active mass of the positive electrode is smaller than that of the negative electrode, such a cell, in the case of temporary reversal of polarity, cannot develop at the end of the discharge any gas, whether hydrogen or oxygen.

I can, however, also proceed in the opposite way, i.e. by reinforcing the positive electrode and incorporating in the negative electrode an antipolar mass, for instance by providing it, in addition to the regular negative mass (cadmium or iron), also with an anodically oxidizable oxide, for instance nickel-hydroxide or codbaltic hydroxide or with an anodically oxidizable metal which is nobler than the metal of the regular negative mass. In that case the nickel hydroxide present in the electrode will act as an acceptor for the oxygen which otherwise would be developed when a reversal of polarity should occur in the electrode.

In order to improve the efficiency of the antipolar mass, it may be useful to add to it a sufficiently large quantity of conductive material, for instance graphite or nickel flakes.

It is, however, also possible, according to this invention, to incorporate in both electrodes of the cell, apart from the ordinary mass also antipolar masses, for instance by incorporating in the positive electrode a cathodically oxidizable oxide or metal nobler than the metal in the regular mass and which therefore displays its action only after the regular negative mass has been discharged.

The antipolar masses selected according to this invention may be accommodated either in pockets, tubes or plates of the electrodes of their own, separated from the regular masses, or they may be mixed with the regular masses in a more or less intimate measure and filled into the electrodes together with these masses.

It is also possible to precipitate the regular masses or their active constituents from solutions together with the antipolar substances.

Various changes may be made in the materials chosen and in the steps taken in accordance with the foregoing specification without departing from the invention or sacrificing the advantages thereof.

I claim:

1. An alkaline-type accumulator battery comprising, in combination, a plurality of individual accumulator cells connected in series, each of said cells including negative electrode means including an active mass, and positive electrode means including an active mass having a capacity substantially smaller than that of said active mass of the negative electrode means, so that upon discharge the capacity of the positive electrode will be faster exhausted than the capacity of the negative electrode and consequent reversal of polarity will occur at the time the capacity of said positive electrode is exhausted, said positive electrode also including a reducible anti-polar mass, whereby when during discharge of the accumulator at any given time the capacity of the positive electrode of the cell having at that time the lowest capacity is exhausted prior to exhaustion of the capacity of the negative electrode thereof due to the substantially larger capacity of the latter and thereby the polarity of the cell is reversed, hydrogen formation at said positive electrode of said exhausted cell of reversed polarity is prevented at least until said anti-polar mass is reduced.

2. An alkaline-type accumulator battery comprising, in combination, a plurality of individual accumulator cells connected in series, each of said cells including negative electrode means including an active mass, and positive electrode means including an active mass having a capacity substantially smaller than that of said active mass of the negative electrode means, so that upon discharge the capacity of the positive electrode will be faster exhausted than the capacity of the negative electrode and consequent reversal of polarity will occur at the time the capacity of said positive electrode is exhausted, said positive electrode also including a reducible anti-polar mass selected from the group consisting of cadmium oxide, cadmium hydroxide and ferric hydroxide, whereby when during discharge of the accumulator at any given time the capacity of the positive electrode of the cell having at that time the lowest capacity is exhausted prior to exhaustion of the capacity of the negative electrode thereof due to the substantially larger capacity of the latter and thereby the polarity of the cell is reversed, hydrogen formation at said positive electrode of said exhausted cell of reversed polarity is prevented at least until said anti-polar mass in reduced.

3. An alkaline-type accumulator battery comprising, in combination, a plurality of sealed individual accumulator cells connected in series, each of said cells including negative electrode means including an active mass, and positive electrode means including an active mass having a capacity substantially smaller than that of said active mass of the negative electrode means, so that upon discharge the capacity of the positive electrode will be faster exhausted than the capacity of the negative electrode and consequent reversal of polarity will occur at the time the capacity of said positive electrode is exhausted, said positive electrode also including a reducible anti-polar mass, whereby when during discharge of the accumulator at any given time the capacity of the positive electrode of the cell having at that time the lowest capacity is exhausted prior to exhaustion of the capacity of the negative electrode thereof due to the substantially larger capacity of the latter and thereby the polarity of the cell is reversed, hydrogen formation at said positive electrode of said exhausted cell of reversed polarity is prevented at least until said anti-polar mass is reduced.

References Cited in the file of this patent

UNITED STATES PATENTS

| | | |
|---|---|---|
| 678,722 | Edison | July 16, 1901 |
| 692,507 | Edison | Feb. 4, 1902 |
| 721,682 | Edison | Mar. 3, 1903 |
| 977,086 | Estelle | Nov. 29, 1910 |
| 1,288,722 | Snelling | Dec. 24, 1918 |
| 1,373,733 | Hubbell | Apr. 5, 1921 |
| 1,442,238 | Smith | Jan. 16, 1923 |
| 2,213,128 | Longuth | Aug. 27, 1940 |
| 2,554,125 | Salauze | May 22, 1951 |
| 2,571,927 | Neumann et al. | Oct. 16, 1951 |
| 2,644,022 | Moulton | June 30, 1953 |

FOREIGN PATENTS

| | | |
|---|---|---|
| 8,195 | Great Britain | 1909 |

OTHER REFERENCES

The Nickel-CD. Storage Battery, Rabkin, October 1950, Tech. Information Service National Research Council, Ottawa.